United States Patent
van Eekelen et al.

(10) Patent No.: US 6,961,508 B2
(45) Date of Patent: Nov. 1, 2005

(54) COATED OPTICAL FIBERS

(75) Inventors: Jan van Eekelen, Rozenburg (NL); Sandra Nagelvoort, Vlaardingen (NL); Duurt Alkema, Den Haag (NL); Paul Buijsen, Geleen (NL); Huimin Cao, Addison, IL (US); Robert W. Johnson, Algonquin, IL (US); David M. Szum, Elmhurst, IL (US)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/421,946

(22) Filed: Apr. 24, 2003

(65) Prior Publication Data

US 2004/0013382 A1 Jan. 22, 2004

Related U.S. Application Data

(60) Provisional application No. 60/374,778, filed on Apr. 24, 2002.

(51) Int. Cl.[7] ............................. G02B 6/00; G02B 6/10
(52) U.S. Cl. ...................... 385/144; 385/126; 385/127; 385/128; 385/145; 385/141; 385/123
(58) Field of Search ................................. 385/123–128, 385/141–145, 114, 378; 264/1.24–1.29; 65/385; 260/1; 525/932; 522/96, 109–112; 427/163.2, 513

(56) References Cited

U.S. PATENT DOCUMENTS

| | | | |
|---|---|---|---|
| 6,528,553 B1 | 3/2003 | Komiya et al. | |
| 6,539,152 B1 * | 3/2003 | Fewkes et al. | 385/114 |
| 6,611,647 B2 * | 8/2003 | Berkey et al. | 385/123 |
| 6,714,712 B2 * | 3/2004 | Bishop et al. | 385/128 |
| 2002/0146225 A1 | 10/2002 | Bulters et al. | |

OTHER PUBLICATIONS

U.S. Appl. No. 10/320,806, filed Dec. 17, 2002, Bulters et al.

* cited by examiner

Primary Examiner—Frank G. Font
Assistant Examiner—Ryan Lepisto
(74) Attorney, Agent, or Firm—Mayer, Brown, Rowe & Maw LLP

(57) ABSTRACT

A coated optical fiber can have a primary coating and a secondary coating, where the primary coating can have good microbending resistance and is obtained by curing a composition having a high cure speed. In one example, a coated optical fiber can include as optical fiber, a primary coating and a secondary coating. The optical fiber can have an attenuation increase of less than 0.650 dB/km at 1550 nm, with the primary coating having a modulus retention ratio of at least 0.5, a glass transition temperature of −35° C., and where the primary coating is obtained by curing a primary coating composition having a cure dose to attain 95% of the maximum attainable modulus of less than 0.65 J/cm².

22 Claims, 1 Drawing Sheet

COATED OPTICAL FIBERS

CROSS REFERENCE TO RELATED APPLICATIONS

The present application claims the benefit of U.S. provisional application No. 60/374,778, which was filed on Apr. 24, 2002 and is hereby incorporated in its entirety by reference.

FIELD OF THE INVENTION

The present invention relates to a coated optical fiber comprising a primary and secondary coating, to a radiation curable primary coating composition, to a combination of a primary and secondary coating, and to a ribbon comprising at least one of said coated optical fibers.

BACKGROUND OF THE INVENTION

Because optical fibers are fragile and easily broken, the optical fibers are usually coated with a protective coating system, for instance with a soft "cushioning" primary coating that is in contact with the fiber and with a relatively hard secondary coating surrounding the primary coating. In addition, the coating system may be used to reduce attenuation, i.e. the loss of optical power as light travels down a fiber, as a result of microbending of the fiber. Providing such coatings should however not be at the expense of the cure speed of coating compositions, as this would limit line speeds in fiber drawing and therewith increase overall production costs. Accordingly, one of the objects of the present invention is to provide a coated optical fiber having a primary coating and a secondary coating, wherein the primary coating has a high cure speed and provides good microbending resistance.

U.S. application Ser. Nos. 09/989,703; 09/717,377; and U.S. Pat. No. 6,528,553 discuss primary coatings and microbending. All three documents are hereby incorporated in their entirety by reference.

SUMMARY OF THE INVENTION

The present invention provides a coated optical fiber having a primary coating and a secondary coating, wherein the primary coating provides good microbending resistance and is obtained by curing a composition having a high cure speed.

In one embodiment, the present invention provides a coated optical fiber comprising:
(i) an optical fiber;
(ii) a primary coating; and
(iii) a secondary coating;
wherein
  (a) said coated optical fiber has an attenuation increase of less than 0.650 dB/km at 1550 nm;
  (b) said primary coating has a modulus retention ratio after hydrolytic aging of at least 0.5 and/or a glass transition temperature below −35° C.; and
  (c) said primary coating is obtained by curing a primary coating composition having a cure dose to attain 95% of the maximum attainable modulus of less than 0.65 J/cm$^2$.

Furthermore, the present invention provides inner primary coating composition having a low in-situ modulus, a high cure speed, and good modulus retention after hydrolytic aging.

In one embodiment, the present invention provides an inner primary coating composition having:
(a) an in-situ modulus (after cure) of less than 0.6 MPa;
(b) a cure dose to attain 95% of the maximum attainable modulus of less than 0.65 J/cm$^2$; and
(c) a modulus retention ratio (after cure) of at least 0.6 after hydrolytic aging.

In another embodiment, the present invention provides an inner primary coating composition having:
(a) an in-situ modulus (after cure) of less than 0.56 MPa;
(b) a cure dose to attain 95% of the maximum attainable modulus of less than 0.65 J/cm$^2$; and
(c) a modulus retention ratio (after cure) of at least 0.5 after hydrolytic aging.

DETAILED DESCRIPTION OF THE INVENTION

Figure 1:
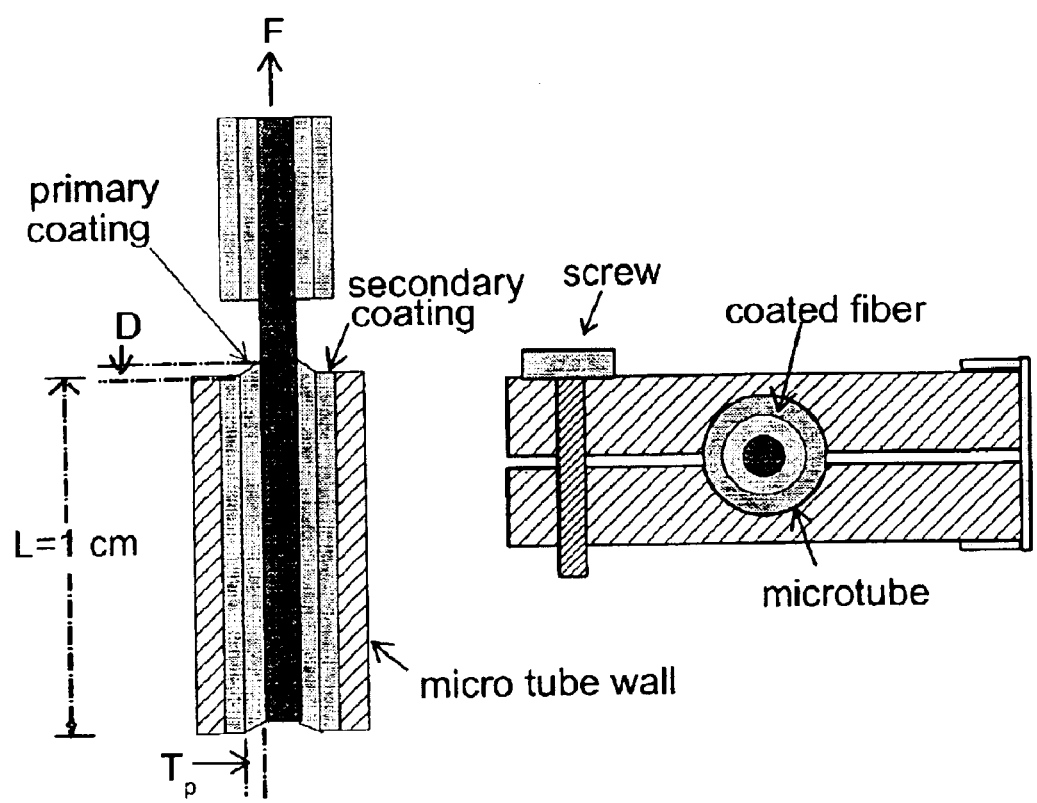
FIG. 1 shows a schematic illustration for an in-situ modulus test sample.

The present invention provides a coated optical fiber having a primary coating and a secondary coating, wherein the primary coating provides good microbending resistance and is obtained by curing a composition having a high cure speed.

Preferably, the coated optical fiber has an attenuation increase of less than 0.650 dB/km at 1550 nm, for instance less than 0.5 or less than 0.4 dB/km at 1550 nm.

Preferably, the primary coating is obtained by curing a primary coating composition, wherein the composition has a cure dose to attain 95% of the maximum attainable modulus of less than 0.65 J/cm$^2$, for instance less than 0.55 J/cm$^2$, less than 0.45 J/cm$^2$, or less than 0.35 J/cm$^2$.

Preferably, the primary coating has an in-situ modulus of less than 0.65 MPa, for instance less than 0.6 MPa, less than 0.56 MPa, less than 0.54 or less than 0.52 MPa.

Preferably, the primary coating also has a good modulus retention, in particular under humid conditions. Accordingly, it is preferred that the ratio of the equilibrium modulus of the primary coating after aging for 8 weeks at 85° C. and at 85% relative humidity to the initial equilibrium modulus after cure is greater than 0.5, for instance greater than 0.6, greater than 0.65, greater than 0.7, greater than 0.75, or greater than 0.9. This ratio is also referred to as "modulus retention ratio after hydrolytic aging".

Furthermore, it is preferred that the primary coating has a glass transition temperature (Tg) below −10° C., for instance below −25° C., below −35° C., or even below −45° C. The Tg is generally above −100° C.

The elongation to break of the primary coating is preferably at least 75%, for instance at least 120% or at least 150%. The elongation to break is generally below 500%.

Generally, the Tg of the secondary coating is about 40° C. or higher, for instance about 50° C. or higher or about 60° C. or higher. The Tg is generally below 200° C.

The tensile modulus of the secondary coating is preferably at least 200 MPa, for instance at least 400 MPa or at least 500 MPa. The tensile modulus will generally be below 3,000 MPa, for instance below 2,000 MPa.

The secondary coating will preferably have an elongation to break of at least 2%, for instance at least 10% or at least 20%. The elongation is generally below 100%.

In order to, for instance, reduce thermal stresses in the coating system, it is preferred that the ratio of the expansion coefficient of the primary coating in the rubbery region to the secondary coating in the glassy region is below 3.0, for instance below 2.0, such as about 1.7.

The primary coating generally will be obtained by curing a radiation curable coating composition based on (meth)

acrylate functional oligomers and radiation-curable monomers with photoinitiator(s) and additives. Examples of additives include a stabilizer and a silane coupling agent. The adhesion to the glass as measured according to adhesion test described in WO 99/15473, which is incorporated herein in its entirety by reference, generally is at least about 5 g in force both at 50% RH and at 95% RH (Relative Humidity). Preferably, the adhesion is at least about 10 g in force, for instance at least about 20 g in force. Generally, the adhesion will be less than 200 g in force, e.g. less than 100 g in force, in view of strippability considerations in ribbon systems, The primary coating composition of the present invention generally comprises (A) 20–98% by wt. of at least one oligomer having a molecular weight of about 1000 or higher, for instance 20–80% by wt. or 30–70% by wt., (B) 0–80% by wt. of one or more reactive diluents, for instance 5–70% by wt., 10–60% by wt., or 15–60% by wt., (C) 0.1–20% by wt. of one or more photoinitiators for initiation of a radical polymerisation reaction, for instance 0.5–15% by wt., 1–10% by wt., or 2–8% by wt., (D) 0–5% by wt. of additives, wherein the total amount adds up to 100 wt. %.

Preferably, the oligomer (A) is a urethane (meth)acrylate oligomer, comprising a (meth)acrylate group, urethane groups and a backbone. (Meth)acrylate includes acrylate as well as methacrylate functionality. The backbone is generally derived from a polyol which has been reacted with a diisocyanate and hydroxy alkyl acrylate. However, urethane-free ethylenically unsaturated oligomers may also be used.

Examples of suitable polyols are polyether polyols, polyester polyols, polycarbonate polyols, polycaprolactone polyols, acrylic polyols, and the like. These polyols may be used either individually or in combinations of two or more. Preferred polyols include polyether polyols, e.g. polytetrahydrofuran polyols, poly(oxyethylene-oxybuiylene) polyols, or polypropylene glycol polyols such as Acclaim 4200 or Acclaim 4200N (commercially available from Lyondell), optionally in combination with polyester polyols (e.g. Priplast 3190, commercially available from Uniqema). Accordingly, in one embodiment, the present oligomers may have a backbone that is derived from (i) one or more polyether polyols, or (ii) one or more polyether polyols in combination with one or more polyester polyols.

There are no specific limitations to the manner of polymerization of the structural units in these polyols. Any of random polymerization, block polymerization, or graft polymerization is acceptable. Examples of suitable polyols, polyisocyanates and hydroxylgroup-containing (meth)acrylates are disclosed in WO 00/18696, which is incorporated herein in its entirety by reference.

The reduced number average molecular weight derived from the hydroxyl number of these polyols is usually from about 50 to about 25,000, preferably from about 500 to about 15,000, more preferably from about 1,000 to about 8,000, and most preferred, from about 1,500 to 6,000. In one embodiment, the polyol(s) used in preparing the oligomer have a molecular weight of at least 2,500 g/mol, for instance at least 3,000 g/mol or at least 4000 g/mol.

The ratio of polyol, di- or polyisocyanate (as disclosed in WO 00/18696), and hydroxyl group-containing (meth)acrylate used for preparing the urethane (meth)acrylate is generally determined so that about 1.1 to about 3 equivalents of an isocyanate group included in the polyisocyanate and about 0.1 to about 1.5 equivalents of a hydroxyl group included in the hydroxyl group-containing (meth)acrylate are used for one equivalent of the hydroxyl group included in the polyol.

In the reaction of these three components, an urethanization catalyst such as copper naphthenate, cobalt naphthenate, zinc naphthenate, di-n-butyl tin dilaurate, triethylamine, and triethylenediamine, 2-methyltriethyleneamine, is usually used in an amount from about 0.01 to about 1 wt % of the total amount of the reactant. The reaction is carried out at a temperature from about 10 to about 90° C., and preferably from about 30 to about 80° C.

The number average molecular weight of the urethane (meth)acrylate used in the composition of the present invention is preferably in the range from about 1,200 to about 20,000 g/mol, for instance from about 2,200 to about 10,000 g/mol. If the number average molecular weight of the urethane (meth)acrylate is less than about 1000 g/mol, the resin composition tends to vitrify at room temperature; on the other hand, if the number average molecular weight is larger than about 20,000, the viscosity of the composition becomes high, making handling of the composition difficult.

Suitable reactive diluents (B) are polymerizable monofunctional vinyl monomers and polymerizable polyfunctional vinyl monomers. Examples of these reactive diluents are disclosed in WO 97/42130, which is incorporated herein in its entirety by reference.

Preferred reactive diluents include alkoxylated alkyl substituted phenol acrylate, such as ethoxylated nonyl phenol acrylate, propoxylated nonyl phenol acrylate, isodecyl acrylate, and alkoxylated bisphenol A diacrylate such as ethoxylated bisphenol A diacrylate. In one embodiment, it is preferred to include one or more alkoxylated aliphatic polyacrylates, for instance an alkoxylated aliphatic diacrylate such as alkoxylated (e.g. propoxylated) neopentyl glycol diacrylate. In another embodiment, it is preferred to include one or more diluents comprising one or more aromatic rings. Aromatic diluents may be helpful in embodiments where a comparatively high refractive index is desired. In one embodiment, the compositions comprise 0–2 wt % vinyl caprolactam, e.g. about 0 wt %.

Preferably, the photoinitiators (C) are free radical photoinitiators.

Free-radical photoinitiators are generally divided into two classes according to the process by which the initiating radicals are formed. Compounds that undergo unimolecular bond cleavage upon irradiation are termed Type I or homolytic photoinitiators.

If the excited state photoinitiator interacts with a second molecule (a coinitiator) to generate radicals in a bimolecular reaction, the initiating system is termed a Type II photoinitiator. In general, the two main reaction pathways for Type II photoinitiators are hydrogen abstraction by the excited initiator or photoinduced electron transfer, followed by fragmentation.

Examples of suitable free-radical photoinitiators are disclosed in WO 00/18696 which is incorporated herein in its entirety by reference. In one embodiment, the compositions comprise 1–4 wt % of one or more photoinitiators, e.g. 2–3.5 wt %. In one embodiment, the present invention comprises 0–2.2 wt % 2,4,6-trimethylbenzoyldiphenylphosphine oxide, for instance 1–2 wt % (commercially available, e.g., as Lucirin TPO from BASF AG).

In one preferred embodiment of the present invention at least one of the photoinitiators contains a phosphorous, sulfur or nitrogen atom. It is even more preferred that the photoinitiator package comprises at least a combination of a photoinitiator containing a phosphorous atom and a photoinitiator containing a sulfur atom.

In another preferred embodiment of the invention, at least one of the compounds (C) is an oligomeric or polymeric photoinitiator.

As an additive (D), an amine compound can be added to the liquid curable resin composition of the present invention to prevent generation of hydrogen gas, which causes transmission loss in the optical fibers. As examples of the amine which can be used here, diallylamine, diisopropylamine, diethylamine, diethylhexylamine, and the like can be given.

In addition to the above-described components, various additives such as antioxidants (e.g. 1,3,5-tris(4-tert.-butyl-3-hydroxy-2,5-dimethylbenzyl)-1,3,5-triazine-2,4,6-(1H, 3H,5H)-trione), UV absorbers, light stabilizers (e.g. bis (1octoxy-2,2,6,6-tetramethyl-4-piperidyl) sebacate), silane coupling agents (e.g. mercaptofunctional silane coupling agents), coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required. In one embodiment, the compositions comprise 0–0.2 wt % of the antioxidant thiodiethylenebis(3,5-di-tert-butyl-4-hydroxy) hydrocinnamate (commercially available as Irganox 1035), e.g. about 0 wt %.

In general, optical fibers are coated first with a primary coating and subsequently with a secondary coating. Suitable secondary coatings are disclosed, for instance, in U.S. Pat. No. 6,080,483, which is hereby incorporated in its entirety by reference. The coatings can be applied as a wet-on-wet system (without first curing of the primary) or as a wet-on-dry system. The primary coating can be colored with a die, or secondary coatings can be colored with pigments or dies, or a clear secondary can be further coated with an ink. The primary and secondary coatings generally have a thickness of about 30 µm each. An ink coating generally has a thickness of about 5 µm (3–10 µm).

The coated and preferably colored optical fibers can be used in a ribbon comprising a plurality of said optical fibers, generally in a parallel arrangement. The plurality of optical fibers is further coated with one or more matrix materials in order to obtain a ribbon. The present invention therefore further relates to a ribbon comprising a plurality of coated and preferably colored optical fibers, generally in a parallel arrangement, said coated optical fiber comprising at least a primary coating according to the present invention and preferably a secondary coating according to the present invention.

The invention will be further elucidated by the following examples, which should be regarded as illustrating the invention and not as limiting the invention.

EXAMPLES

Examples 1–7 and Comparative Examples A–D

Primary coating compositions were prepared according to the formulations listed in Table 1 below (amounts of ingredients listed in weight% relative to total weight of the composition). Also listed are physical properties of the primary coating (see below for sample preparation and test methods).

TABLE 1

| Primary coating compositions | | | | |
|---|---|---|---|---|
| | Ex. A | Ex. B | Ex. C | Ex. D |
| Ingredients | | | | |
| Oligomer 1[a] | 68.60 | — | — | — |
| Oligomer 2[b] | — | 52.66 | 56.90 | — |
| Oligomer 3[c] | — | — | — | — |
| Oligomer 4[d] | — | — | — | 77.10 |
| Ethoxylated Nonyl Phenol Acrylate | 7.0 | 21.43 | 17.02 | — |
| Tridecyl acrylate | 7.0 | — | — | — |
| Isodecyl acrylate | — | — | 22.00 | 8.5 |

TABLE 1-continued

| Primary coating compositions | | | | |
|---|---|---|---|---|
| | Ex. A | Ex. B | Ex. C | Ex. D |
| Phenoxyethylacrylate | — | — | — | — |
| Isobornyl acrylate | — | 10.71 | — | — |
| Lauryl acrylate | — | 6.0 | — | — |
| Propoxylated (3) Trimethylolpropane triacrylate | — | — | — | — |
| Ethoxylated bisphenol diacrylate | — | — | — | — |
| Vinyl Caprolactam | 4.0 | 6.31 | — | 5.0 |
| Ethoxylated Aliphatic Acrylate (Ebecryl 111 from UCB Chemicals) | 5.0 | — | — | — |
| Propoxylated (2) Neopentyl Glycol Diacrylate (SR9003) | 4.0 | — | — | 5.0 |
| Lucerine TPO (photoinitiator) | 1.3 | 1.58 | 1.71 | 1.3 |
| Irgacure 184 (photoinitiator) | 1.8 | — | 1.00 | 1.8 |
| Irganox 1035 (stabilizer) | 0.3 | 0.32 | 0.34 | 0.3 |
| Irganox 3790 (stabilizer) | — | — | — | — |
| Cyanox 1790 (stabilizer) | — | — | — | — |
| Tinuvin 123 | — | — | — | — |
| Silane coupling agent | 1.0 | 1.0 | 1.0 | 1.0 |
| Properties | | | | |
| Viscosity (mPas) | 5656 | 7500 | 8100 | 8840 |
| Tensile Strength (MPa) | 0.7 | 1.3 | 0.9 | 1.7 |
| Elongation at break (%) | 230 | 170 | 160 | 200 |
| Secant modulus (MPa) | 0.7 | 0.9 | 1.5 | 1.1 |
| Cure dose to attain 95% of modulus (J/cm$^2$) | 0.21 | 0.3 | 0.7 | 0.3 |
| Tg (° C.) | −51 | −25 | −45 | −30 |
| Measured shear modulus $G_{measured}$ (MPa) | 0.145 | 0.22 | 0.1 | ND |
| Primary coating thickness (micron) | 34 | 30 | 25 | ND |
| In-situ Modulus (MPa) | 0.58 | 0.89 | 0.29 | ND |
| Microbending attenuation increase @ 1310 nm (dB/km) | 0.185 | 0.512 | 0.2 | 0.182–0.205 |
| Microbending attenuation increase @ 1550 nm (dB/km) | 0.709 | 1.473 | 0.454 | 0.589–0.762 |
| Microbending attenuation increase @ 1700 nm (dB/km) | 2.61 | 3.807 | 1.54 | 1.80–2.38 |
| Modulus retention ratio after hydrolytic aging | 0.5 | 0.76 | ND | 0.25 |

[a]prepared by reacting Acclaim4200, toluenediisocyanate, and hydroxyethylacrylate in the presence of catalyst and stabilizer.
[b]prepared by reacting PTGL2000 (polytetrahydrofuran poyol with Mw of about 2000), isophoronediisocyanate and hydroxyethylacrylate in the presence of catalyst and stabilizer.
[c]prepared by reacting Acclaim4200, Priplast3190, isophoronediisocyanate, and hydroxyethylacrylate in the presence of catalyst and stabilizer.
[d]prepared by reacting Acclaim4200N, Priplast3190, isophoronediisocyanate, and hydroxyethylacrylate in the presence of catalyst and stabilizer.

TABLE 2

Primary coating compositions

| | Ex. 1 | Ex. 2 | Ex. 3 | Ex. 4 | Ex. 5 | Ex. 6 | Ex. 7 |
|---|---|---|---|---|---|---|---|
| Ingredients | | | | | | | |
| Oligomer 1* | 66.15 | — | — | 74.10 | 66.4 | 66.0 | 70.60 |
| Oligomer 2* | — | — | — | — | — | — | — |
| Oligomer 3* | — | 77.10 | — | — | — | — | — |
| Oligomer 4* | — | — | 66.20 | — | — | — | — |
| Ethoxylated Nonyl Phenol Acrylate | 5.0 | — | 10.0 | — | 5.0 | 5.0 | 6.0 |
| Tridecyl acrylate | — | — | — | — | — | — | — |
| Isodecyl acrylate | 8.5 | 8.5 | 8.5 | 10.0 | 8.5 | 8.5 | 8.5 |
| Phenoxyethylacrylate | 4.0 | — | — | — | 4.0 | 4.0 | — |
| Isobornyl acrylate | — | — | — | — | — | — | — |
| Lauryl acrylate | — | — | — | — | — | — | — |
| Propoxylated (3) Trimethylolpropane triacrylate | 4.0 | — | 5.0 | 4.0 | 4.0 | 4.0 | 4.0 |
| Ethoxylated bisphenol diacrylate | 2.0 | — | 2.0 | — | 2.0 | 2.0 | 2.0 |
| Vinyl Caprolactam | — | 5.0 | — | — | — | — | — |
| Ethoxylated Aliphatic Acrylate (Ebecryl 111 from UCB Chemicals) | — | — | — | — | — | — | — |
| Propoxylated (2) Neopentyl Glycol Diacrylate (SR9003) | 4.0 | 5.0 | 3.0 | 6.0 | 4.0 | 4.0 | 3.0 |
| Lucerine TPO (photoinitiator) | 1.5 | 1.3 | 1.3 | 1.3 | 1.5 | 2.3 | 1.3 |
| Irgacure 184 (photoinitiator) | 1.8 | 1.8 | 1.8 | 1.8 | 1.8 | 1.8 | 1.8 |
| Irganox 1035 (stabilizer) | — | 0.3 | — | — | — | — | — |
| Irganox 3790 (stabilizer) | 1.4 | — | 0.7 | — | 1.4 | 1.4 | 1.4 |
| Cyanox 1790 (stabilizer) | — | — | — | 1.4 | — | — | — |
| Tinuvin 123 | 0.4 | — | — | 0.4 | 0.4 | — | 0.4 |
| Silane coupling agent | 1.25 | 1.0 | 1.5 | 1.0 | 1.0 | 1.0 | 1.0 |
| Properties | | | | | | | |
| Viscosity (mPas) | 6134 | 8500 | 6673 | 8761 | 6329 | 5850 | 6300 |
| Tensile Strength (MPa) | 2.36 | 0.8 | 1.8 | 1.085 | 1.89 | 2.56 | 1.6–1.9 |
| Elongation at break (%) | 184 | 150 | 160 | 171 | 163 | 173 | 170 |
| Secant modulus (MPa) | 0.98 | 0.9 | 0.86 | 1.14 | 1.06 | 0.98 | 0.9 |
| Cure dose to attain 95% of modulus (J/cm$^2$) | 0.47 | ND | 0.32 | 0.51 | 0.6 | 0.3–0.4 | 0.4–0.5 |
| Tg (° C.) | −47.4 | ND | −23.2 | −50.4 | −50 | −52 | −52 |
| Measured shear modulus $G_{measured}$ (MPa) | 0.16 | 0.17 | 0.16 | 0.15 | 0.12 | 0.15 | 0.15 |
| Primary coating thickness (micron) | 28 | 30 | 27 | 30 | 28 | 28 | 31 |
| In-situ Modulus (MPa) | 0.55 | 0.65 | 0.54 | 0.54 | 0.40 | 0.51 | 0.59 |
| Microbending attenuation increase @ 1310 nm (dB/km) | 0.116 | 0.184 | 0.117 | 0.213 | 0.135 | ND | 0.115 |
| Microbending attenuation increase @ 1550 nm (dB/km) | 0.365 | 0.405 | 0.375 | 0.628 | 0.465 | ND | 0.442 |
| Microbending attenuation increase @ 1700 nm (dB/km) | 1.168 | 0.960 | 1.148 | 1.806 | 1.504 | ND | 1.434 |
| Modulus retention ratio after hydrolytic aging | ND | ND | ND | 0.64 | ND | ND | 0.80 |

*See (footnotes of) Table 1 for details on oligomers.

Test Methods (i) Cure Dose

The cure speed of the compositions was determined as the cure dose required to attain 95% of the maximum attainable modulus. This cure dose was determined by Dose vs. Modulus curve analysis. Hereto, 6 radiation-cured sample films of each composition were prepared, with each sample film being obtained by applying an approximately 75 microns thick composition layer on a plate and subsequently curing the composition layer. Each composition layer was cured with a different dose: 0.2, 0.3, 0.5, 0.75, 1.0, and 2.0 J/cm$^2$ respectively. Six specimens were cut from the center portion of each prepared sample film. A Universal Testing Instrument, INSTRON Model 4201 equipped with a suitable personal computer and software "Series IX Materials Testing System" was used to measure the modulus of each specimen. The modulus measurements were then entered into the software package and the calculations were automatically performed with a determination of the average modulus for each film sample. The dose-modulus curve was then created by plotting the modulus values vs. the dose and by fitting a curve through the data points. The "cure dose" of the coating composition was determined to be the dose at which 95% of the ultimate secant modulus is attained.

(ii) Tensile Strength, Elongation and Modulus Test Method

The tensile strength, elongation and secant modulus of cured samples were tested using a universal testing instrument, Instron Model 4201 equipped with a personal computer and software "Series IX Materials Testing System." The load cells used were 4.4 Kg capacity. The ASTM D638M was followed, with the following modifications.

A drawdown of each material to be tested was made on glass plate and cured using a UV processor. A minimum of eight test specimens, having a width of 12.7.+−.0.005 mm and a length of 12.7 cm, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate. The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The crosshead speed was set to 25.4 mm/min, and the crosshead action was set to "return at break". The crosshead was adjusted to 50.8 mm jaw separation. The air pressure for the pneumatic grips was turned on and set to approximately 1.5 Kg/cm$^2$.

After the Instron test instrument had been allowed to warm-up for fifteen minutes, it was calibrated and balanced following the manufacturer's operating procedures. The temperature near the Instron instrument was measured and the humidity was measured at the location of the humidity gauge. This was done just before beginning measurement of the first test specimen.

Specimens were only analyzed if the temperature was within the range 23±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and secant, or segment, modulus were checked to determine whether any one of them deviated from the average enough to be an "outlier." If the modulus value was an outlier, it was discarded. If there were less than six data values for the tensile strength, then the entire data set was discarded and repeated using a new plate.

(iii) Viscosity

The viscosity was measured using a Physica MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. The sample in the cup was examined and if it contains an excessive amount of bubbles, they were removed by a direct means such as centrifugation, or enough time was allowed to elapse to let the bubbles escape from the bulk of the liquid. Bubbles at the top surface of the liquid are acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which will produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the sample's viscous properties. The results reported are the average viscosity values of three test samples.

(iv) Glass Transition Temperature

The elastic modulus (E'), the viscous modulus (E"), and the tan delta (E"/E'), which is an indication of the material's $T_g$, of the examples were measured using a Rheometrics Solids Analyzer (RSA-11), equipped with: 1) a personal computer having MS-DOS 5.0 operating system and having Rhios® software (Version 4.2.2 or later) loaded, and 2) a liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −80° C. and increasing the temperature at about 1/minute until the temperature reached about 60° C. to about 70° C. The test frequency used was 1.0 radian/second. The DMA instrument produced a plot of the data on the computer screen. The temperature at which E' is 1,000 MPa and E' is 100 MPa was calculated from this plot, as well as the tan delta peak. The temperature corresponding with the tan delta peak is reported as the glass transition temperature (Tg).

(v) In-situ Modulus

A glass optical fiber was coated using a primary composition according to Table 1 and a commercial secondary composition (secant modulus 750 MPa, elongation at break 25%, glass transition temperature 55° C., coefficient of expansion in the glassy region <100×10$^{-6}$/° C.). The thus obtained coated fiber was then placed in a metal sample fixture, as schematically shown in FIG. 1: A small portion of the coating layer was stripped in the middle of the fiber; the length of the bottom part of the fiber was cut to be exactly 1 cm; the bottom of the fiber was inserted into a micro tube in the fixture; the micro tube consisted of two half hollow cylinders; its diameter was made to be the same as the fiber outer diameter; the fiber was tightly gripped after the screw was tightened; the gripping force on the secondary coating surface was uniform and no significant deformation occurred in the coating layer. The fixture with the fiber was then mounted on DMA (same instrument as used to determine the glass transition temperature). The metal fixture was clamped by the bottom grip. The top grip was tightened, pressing on the top portion of the coated fiber to the extent that it crushed the coating layer. The DMA was set to the shear sandwich mode to measure the shear modulus of the primary coating. Under the force F, the primary coating layer is sheared with a displacement D while essentially no deformation occurs in the stiff secondary coating. The test frequency used was 1.0 radian/second. The shear strain S (=D/T$_p$) was set to be 0.05. With this low level of strain and stress, the deformation was proven to be in the linear viscoelastic region and no delamination occurred at the interface of glass and primary coating. The shear modulus G was thus obtained (values indicated in Table 1). This shear modulus G was then corrected for stretch of the glass during measurement by the following formula:

$1/G_{corrected} = 1/G_{measured} - 1/G_{glass}$, wherein $G_{glass}$ is a glass stiffness factor and was taken to be 0.85 MPa.

$G_{corrected}$ was then further corrected by adjusting for the real thickness of the primary coating (the thickness assumed when obtaining $G_{measured}$ was always 30 micron), resulting in G. See Table 1 for the real thickness of the primary coatings. Finally, the in-situ modulus E was calculated with the following formula:

$E = 2(1+v)G = 3G$, wherein $v$ is the primary coating Poisson ratio = 0.5.

(vi) Modulus Retention Ratio After Hydrolytic Aging

An elastic modulus E' curve was determined according to the method described in method (iv) above, except that the cured film was aged for 8 weeks at a temperature of 85° C. at 85% relative humidity. The equilibrium modulus E$_0$ was determined as the minimum value of E' in the rubbery region of the curve. The ratio of the equilibrium modulus after aging to the equilibrium modulus prior to aging is reported as the modulus retention ratio after hydrolytic aging.

(vii) Microbending

A glass optical fiber (single mode fiber having a field diameter of 10.5 micron±1 micron at 1550 nm and 9.3 micron±0.4 micron at 1310 nm) was coated using a primary composition according to Table 1 and a commercial secondary composition. The microbending resistance of the fiber was determined by determining the attenuation of the coated optical fiber before and after winding the fiber around a drum (diameter 600 mm) covered with sandpaper (40 μm Alox grade by 3M™). The winding force was kept constant at 4 N. The attenuation increase (difference between attenuation before and after winding) was determined at various wavelengths (as indicated in Table 1).

What is claimed is:

1. A coated optical fiber comprising:
   (i) an optical fiber;
   (ii) a primary coating; and
   (iii) a secondary coating;
   wherein
   (a) said coated optical fiber has an attenuation increase of less than 0.650 dB/km at 1550 nm;
   (b) said primary coating has a modulus retention ratio after hydrolytic aging of at least 0.5 and/or a glass transition temperature (Tg) below −35° C.; and
   (c) said primary coating is obtained by curing a primary coating composition having a cure dose to attain 95% of the maximum attainable modulus of less than 0.65 J/cm$^2$.

2. The coated optical fiber of claim 1, wherein said primary coating has an in-situ modulus of less than 0.60 MPa.

3. The coated optical fiber of claim 1, wherein said primary coating has an in-situ modulus of less than 0.56 MPa.

4. The coated optical fiber of claim 1, wherein said attenuation increase is less than 0.5 dB/km.

5. The coated optical fiber of claim 1, wherein said primary coating composition comprises an ethylenically unsaturated oligomer.

6. The coated optical fiber of claim 5, wherein said oligomer is prepared by reacting the following components:
   (1) one or more polyisocyanates;
   (2) one or more polyols; and
   (3) one or more hydroxyfunctional (meth)acrylates.

7. The coated optical fiber of claim 6, wherein said one or more polyols includes polypropylene glycol.

8. The coated optical fiber of claim 6, wherein said one or more polyols consists essentially of polypropylene glycol.

9. The coated optical fiber of claim 6, wherein said one or more polyols includes a polyester polyol.

10. The coated optical fiber of claim 6, wherein said one or more polyols each have a molecular weight of at least 3,000 g/mol.

11. The coated optical fiber of claim 6, wherein said one or more hydroxyfunctional (meth)acrylates includes hydroxyethyl acrylate.

12. The coated optical fiber of claim 1, wherein said primary coating composition comprises one or more monomers.

13. The coated optical fiber of claim 12, wherein said one or more monomers includes an alkoxylated acrylate monomer.

14. The coated optical fiber of claim 12, wherein said one or more monomers includes an alkoxylated aliphatic polyacrylate monomer.

15. The coated optical fiber of claim 1, wherein said cure dose is below 0.55 J/cm$^2$.

16. The coated optical fiber of claim 1, wherein said primary coating has a Tg below −35° C.

17. The coated optical fiber of claim 1, wherein said primary coating has a Tg below −45° C.

18. The coated optical fiber of claim 1, wherein said secondary coating has:
   (a) a Tg of at least 40° C.;
   (b) a secant modulus of at least 400 MPa; and
   (c) an elongation at break of at least 10%.

19. The coated optical fiber of claim 1, wherein said an optical fiber is an optical glass fiber.

20. An inner primary coating composition having:
(a) an in-situ modulus (after cure) of less than 0.6 MPa;
(b) a cure dose to attain 95% of the maximum attainable modulus of less than 0.65 J/cm$^2$; and
(c) a modulus retention ratio (after cure) of at least 0.6 after hydrolytic aging.

21. The composition of claim 20, wherein said composition comprises a radiation-curable oligomer selected from the group consisting of:
(i) radiation-curable oligomers having a backbone derived from one or more polyether polyols; and
(ii) radiation-curable oligomers having a backbone derived from one or more polyether polyols in combination with one or more polyester polyols.

22. An inner primary coating composition having:
(i) an in-situ modulus (after cure) of less than 0.56 MPa;
(ii) a cure dose to attain 95% of the maximum attainable modulus of less than 0.65 J/cm$^2$; and
(iii) a modulus retention ratio (after cure) of at least 0.5 after hydrolytic aging.

* * * * *